United States Patent Office 3,538,731
Patented Nov. 10, 1970

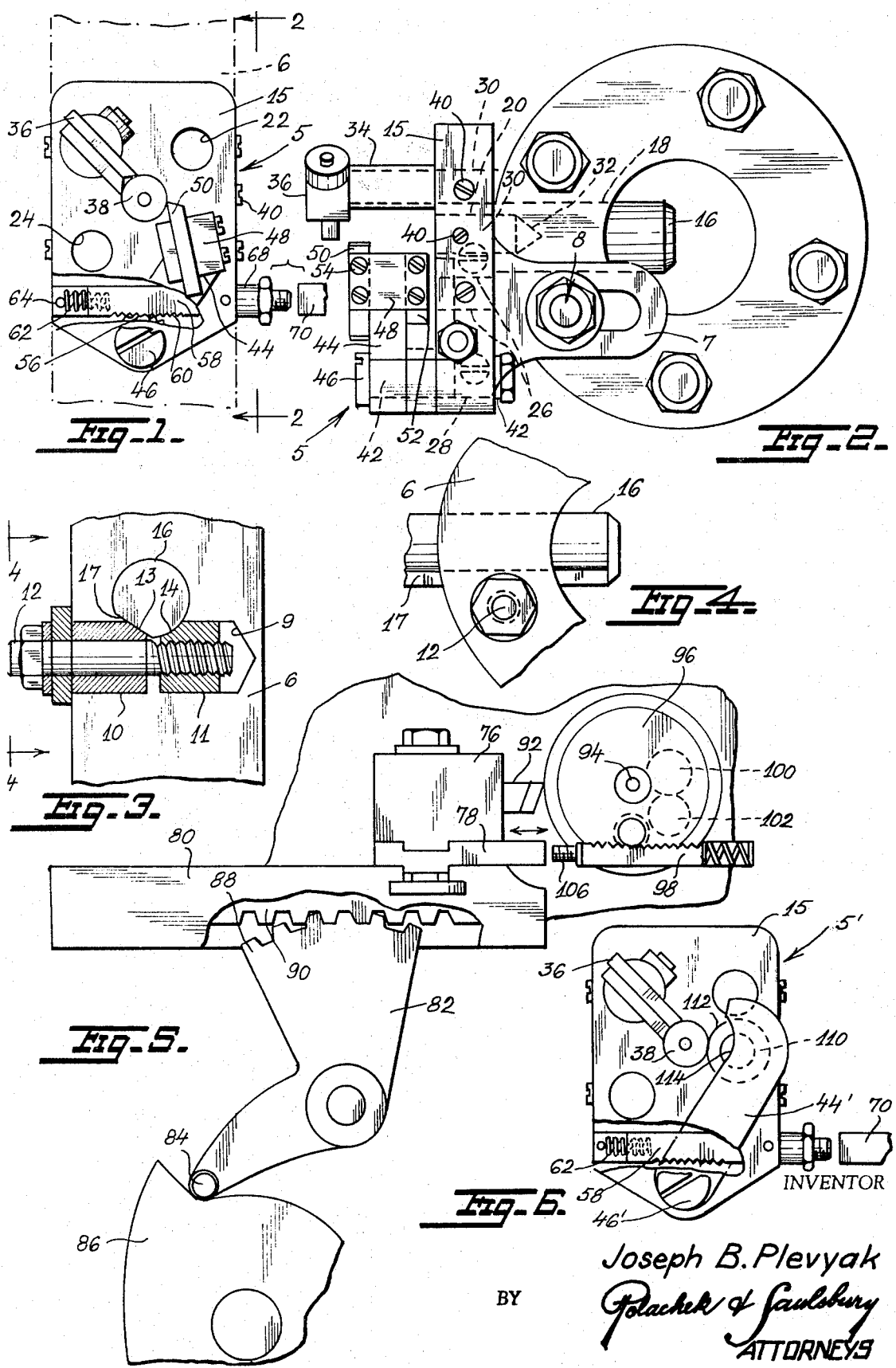

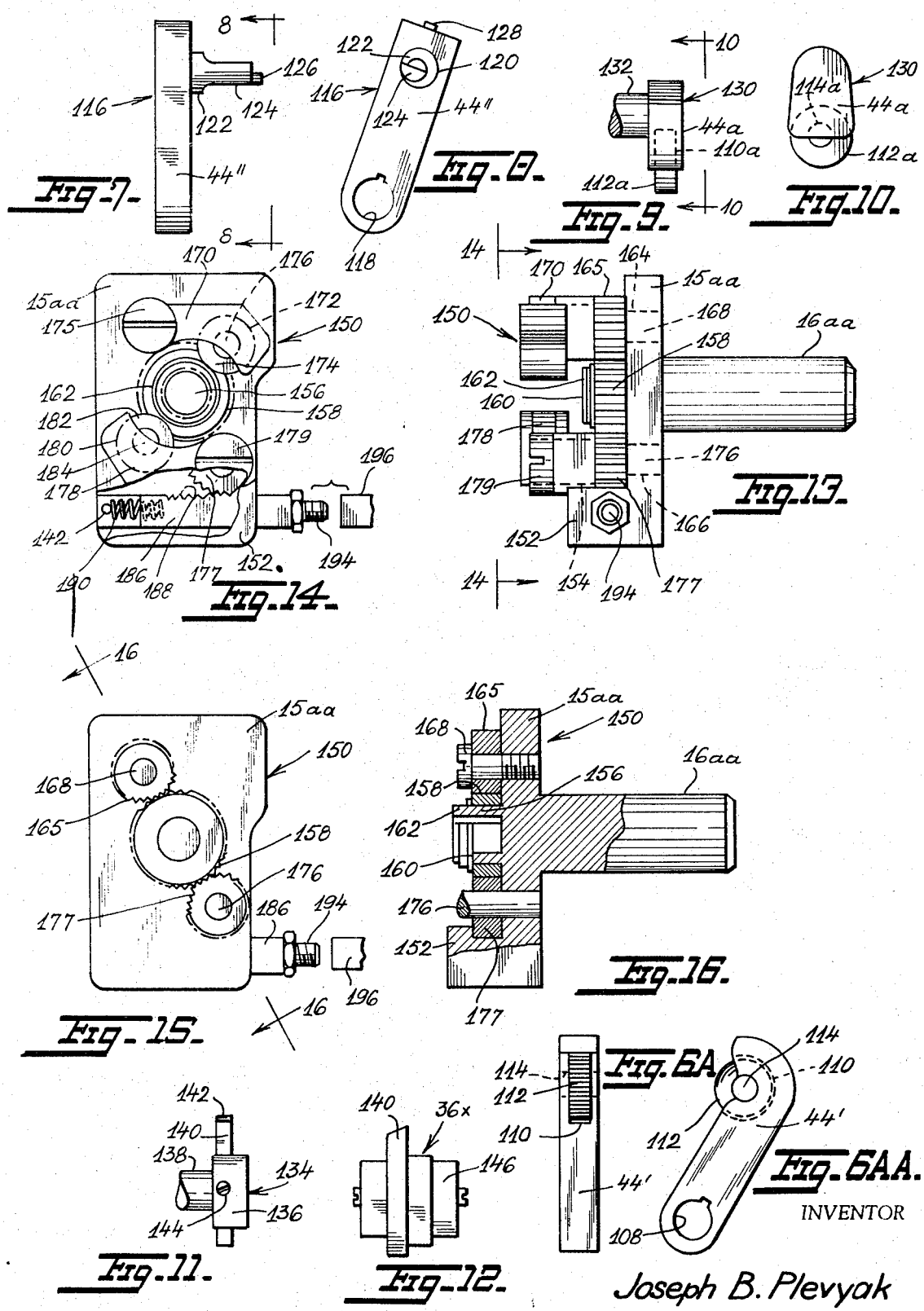

3,538,731
KNURLING TOOL
Joseph B. Plevyak, 57 Madison St., Newton, N.J. 07860
Continuation-in-part of application Ser. No. 345,200,
Feb. 17, 1964. This application Oct. 24, 1967, Ser.
No. 677,675
Int. Cl. B21d 37/06
U.S. Cl. 72—108                                   2 Claims

ABSTRACT OF THE DISCLOSURE

Cam actuated machine tools and spindles comprising in combination a plate body for supporting multiple operations tool assemblies such as a combined swing knurl, thread roll and adjustable knurl tool assembly and a two-spindle cross drill tool assembly, both assemblies having rectangular shaped bodies with a shank radiating from one side of each body, for attachment to a turret, means for supporting a workpiece on the plate body, at least one assembly having shafts rotatably mounted in the body, arms fixed at one end to said shafts, rotatable knurl rolls carried on the free ends of the arms, and means for pivoting said shafts whereby said rolls are swung into engagement with a workpiece therebetween, said means including a spring-pressed slidable rack bar operatively connected to the arms, an actuating rod engaging said rack bar and a guide member of a cam-actuated cross slid movable against the actuating rod.

---

This invention relates to a cam actuated tool with tool and work spindles; and this application is a continuation-in-part application of my copending application, Ser. No. 345,200, filed Feb. 17, 1964, and now Pat. No. 3,349,656.

The invention relates to all types of tools and spindles, turret lathe or otherwise, that willl end themselves to be moved or rotated by a cam actuated slidable pusher bar or lever, directly, or, through a gear train arrangement.

Specific and precise movements and rotations are transmitted from a cam lobe, designed and calculated to produce movements only in work position and during the period of a particular operation. This eliminates constant movement or rotation, reducing friction, heat, wear, auxiliary drive units, etc., resulting in a simplified and efficient machine tool setup.

A principal object of the invention is to provide new and useful improvement in a tool assembly of the kind described that is highly efficient in performing multiple operations, dead center tool pressures, cutoff burr removal and back end operations, cross drilling and tapping operations, etc., and operating only in a work position.

Another object of the invention is to provide a tool assembly of this kind that is sturdy and simple in construction and economical to manufacture.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front elevational view of a swing tool assembly embodying the invention, on a turret lathe, a workpiece being shown in position, a guide being shown in operative position therewith.

FIG. 2 is a side view as seen along the line 2—2 of FIG. 1, the workpiece being omitted.

FIG. 3 is a fragmentary sectional view showing the mechanism for locking the shank of the tool in position against radial movement.

FIG. 4 is a fragmentary side view as seen from the line 4—4 of FIG. 3 showing modified mechanism for holding the shank of the tool against radial movement.

FIG. 5 is a fragmentary side elevational view showing mechanism for driving a modified form of cutting-off tool, parts being broken away.

FIG. 6 is a view similar to FIG. 1 showing a knurling member embodied in the tool in place of the cutting-off knife.

FIG. 6A is a side elevational view, and FIG. 6AA is a front elevational view of the knurling member of FIG. 6.

FIG. 7 is a side elevational view of another modified form of tool adapted to be used with the device of FIG. 1.

FIG. 8 is a front elevational view thereof as seen from line 8—8 of FIG. 7.

FIG. 9 is a side elevational view of still another modified form of tool adapted to be used with the device of FIG. 1.

FIG. 10 is a front elevational view thereof as seen from the line 10—10 of FIG. 9.

FIG. 11 is a side elevational view of yet another modified form of tool adapted to be used with the device of FIG. 1.

FIG. 12 is a front elevational view of FIG. 11.

FIG. 13 is a side elevational view of a turret lathe adjustable knurling tool assembly embodying another modified form of the invention.

FIG. 14 is a front elevational view thereof as seen from the line 14—14 of FIG. 13.

FIG. 15 is a front view of the tool body of FIG. 14 with supported gears.

FIG. 16 is a sectional view taken on the line 16—16 of FIG. 15.

Referring now in detail to the drawings, in FIGS. 1 to 4, there is shown a tool assembly 5 capable of selectively supporting cutting, knurling, turning, grooving or recessing swing tool members. The tool assembly is shown adjustably mounted in a lathe turret 6 for swinging therewith, by means of a slotted bracket 7, the assembly being locked in position by a bolt and nut assembly 8 extending through the slot of the bracket and into a deep recess 9 in the turret 6. The bolt and nut assembly includes a bushing member 10 in the recess 9 and a nut member 11 in the recess in alignment with the bushing member. A threaded bolt 12 extends through the bushing member and nut member. The inner end edge of the bushing member is formed with a notch 13 having a tapering wall, while the adjacent end of the nut member is formed with a notch 14, having a curved wall. The turret 6 is formed with a plurality of spaced tool-holding holes 18.

The tool assembly 5 comprises a tool body constituted by a heavy rectangular plate 15, with smooth surfaces on both sides. A shank 16 extends radially from one side of the plate, at the center thereof. The shank is positioned slightly above midlength thereof. Shank 16 is formed with a flat surface 17 which is adapted to seat in the adjacent notches 13 and 14 of the bushing and nut member so that upon setting up the bolt 12 the shank will be held in position and the tool assembly locked against turning movement.

The plate 15 is formed with a plurality of holes, to wit, a pair of spaced holes 20 and 22, a pair of intermediate holes 24 and 26, and a bottom center hole 28. The holes constitute stations for receiving various types of operating tool members. Another hole 30 is formed in the plate between the pairs of holes and centrally of the plate, which hole is aligned with a recess 32 in the shank 16.

In hole 20, the shank 34 of a back rest 36 for supporting a workpiece 38, is clamped in supported position in tool body 15 by a set screw 40.

In hole 28, a stub shaft 42 is rotatably mounted and secured to the shaft and carried around thereby is a rectangular shaped block-like arm 44. Shaft 42 is received in a round hole at one end of the block-like supporting arm and the arm is secured thereon in a set (key) position by a screw 46 extending axially into the shaft. A block 48 is suitably fixed on the other free end of the arm and carried thereby in angular position relative to the arm, is a pair of cutting knives 50 and 52 secured by set screws 54. The arm 44 is adapted to be swung automatically on the shaft 42 toward and away from the workpiece 38 supported by the back rest 36, and is adapted to be inverted readily for right or left hand operations.

The means for swinging the arm 44 includes a pinion 56 fixed on the shaft 42. A rack bar 58 is slidably mounted in the plate 15 in a horizontal plane with its teeth 60 in mesh with the teeth of the pinion 56 so that movement of the bar is transmitted to pinion 56 and from the wheel or pinion to the shaft 42 thereby swinging the arm 44 with its knives 50 and 52. A compresssion spring 62 interposed between the end of the bar and a pin 64 urges the bar outwardly or to the right as viewed in FIG. 1 and the knives away from the workpiece when not in use. Spring 62 also returns the entire arm assembly when not in use.

In use, when the tool assembly is clamped to the turret 6, the arm 44 is in position ready to bring the knives 50 and 52 to the center line of the workpiece 38 for the necessary cutting operations thereon. The arm 44 is moved by an actuating rod 68 automatically moved by a fixed guide 70 which is mounted on a cam-actuated front cross slide (not shown). The rod 68 may, however, also be pressed against the guide by the forward movement of the turret slide or cross slide for tapering operations, etc. When not in use, the arm 44 is held away from the workpiece 38 by the coil spring 62.

In FIG. 5, modified mechanism for driving swing tools and revolving tools is shown. This mechanism includes a tool post 76 mounted on a fixed guide 78 which is mounted on a cross slide 80. This is standard machine mechanism. The cross slide is moved by means of a bell crank lever 82, with roller 84, actuated by a cam 86. Teeth 88 on the lever mesh with teeth 90 on the cross slide thereby imparting movement to the cross slide.

The tool post 76 supports a cutting knife 92 which is adapted to operate on a workpiece 94 supported on a spindle chuck 96. The knife is shown in retracted position. Bar 98 is moved by an actuating rod 106 automatically moved by the fixed guide 78 which is mounted on cross slide 80, thereby imparting movement to the swing tools, and/or rotation through meshing gears 100 and 102 to revolving tools.

The tool assembly 5' shown in FIG. 6 is similar to the tool assembly of FIG. 1 except that a knurling tool member is mounted on shaft 42 instead of a cutting tool member. The knurling tool member comprises an arm 44' formed at one end with a round hole to receive the shaft 42 and is fixed on the shaft by the screw 46'. The other end of the arm 44' is curved and formed with a recess 110 intersecting one long edge of the arm. A knurl or roll 112 is fixed on a shaft 114 which is journalled in the side walls of the recess 110. The roll 112 is positioned in the recess 110 but projects outwardly of the recess in order to contact the workpiece 38'.

When the tool assembly is clamped in the turret, the pivoting point of the arm 44' is so positioned that the roll 112 is in a position to swing into the center line of the workpiece 38'.

In FIGS. 7 to 12, inclusive, various types of operating tool members adapted to be used in the tool assembly 5 of FIG. 1 are illustrated.

A grooving or recessing tool member 116 is shown in FIGS. 7 and 8. Tool member 116 comprises an arm 44" similar to arm 44 of the cutting tool member of FIG. 1, with a round hole 118 in one end thereof to receive the shaft 42. The socket 120 is formed in the other end of the arm to receive the round body portion 122 of a semiround cutter 124 with an extension 126. A set screw 128 holds the cutter in the socket. When the arm is supported on the shaft 42, the cutter 124 is in a position to swing into the center line of the workpiece.

A knurling and roller back rest tool member 130 is shown in FIGS. 9 and 10. Tool member 130 comprises a substantially rectangular block-like arm 44a formed with a laterally extending shank 132. The long edges of the arm taper slightly downwardly and outwardly and the bottom wider end of the arm is formed with a central recess 110a intersecting the bottom end edge. A straight thread knurl or roll 112a is fixed on a shaft 114a which is journalled in the wall of the recess 110a. The roll is positioned in the recess but projects outwardly of the recess in order to contact the workpiece. The roll 112a is in a position to be swung into the center line of the workpiece.

A turning, burnishing, back rest, etc., tool member 134 is shown in FIGS. 11 and 12. Tool member 134 includes a rectangular-shaped body 136 having a laterally extending round shank 138. The body is formed with a passage to receive a turning tool member or arm 140 with a cutting edge 142. The tool member is held in position by a set screw 144.

In FIG. 12, a front view of the tool member 134 of FIG. 11 is shown including a device 36x which is a block or spacer reversible with cutter member 140. The device 36x can be used as a back rest such as the rest 36 of FIG. 1. This back rest or turning tool has a cylindrical stepped body 146 supporting the projecting arm 140 adapted to contact the workpiece to be supported, or for turning on back rest tools. Tools fixed in the center hole are used for drilling, center drilling, etc.

In FIGS. 13 to 16, inclusive, a combination swing knurl thread roll and adjustable knurl tool assembly 150 is shown. The tool assembly 150 comprises a heavy rectangular-shaped plate-like body 15aa. The bottom end of the body extends forwardly as indicated at 152 forming a shelf 154. An integral shank 16aa extends radially from the body 15aa, at the rear thereof.

Centrally and midway its ends, the body at the front is formed with an integral extension, round in cross section, forming a bearing 156 above the shelf for an idler gear 158. The gear is held in position thereon by a washer 160 and a split snap retaining ring 162.

A hole 164 is formed in the plate body 15aa adjacent one end thereof, the top end as viewed in FIG. 13, to one side of the center line of the body, and a similar hole 166 is formed adjacent the other or bottom end and to the other side thereof. A stud shaft 168 is mounted in hole 164 and an arm 170 is rotatably mounted on shaft 168. A pinion 165 is mounted on the inner end of arm 170 and meshes with an idler gear 158. One end of the arm is formed with a recess 172, intersecting one long edge of the arm. A knurl or roll 174 is fixed on a shaft 176 journalled in the side walls of the recess. The roll is positioned in the recess but extends outwardly in order to contact the workpiece. A stud 168 rotatably holds the arm and pinion to the tool body 15aa.

A stud shaft 176 is mounted in hole 166 and fixed on the inner end of the shaft there is a pinion 177 in mesh with the gear 158, and outwardly of the pinion on the shaft there is one end of an arm 178, the other end of the arm being formed with a recess 180 therein intersecting one long edge of the arm. A screw 179 holds the pinion and the arm on the shaft. A knurl or roll 182 is fixed on a shaft 184 journalled in the walls of the recess. The roll 182 is positioned in the recess but extends outwardly thereof in order to contact the workpiece. The rolls 174 and 182 are in angular opposed relation as seen in FIG. 14, outwardly of the plane of the gear and pinions.

The means for swinging the arms 170 and 178 includes a rack bar 186 slidably mounted in the forward extension 152 at the bottom of the plate body, with its teeth 188 in mesh with the teeth on the pinion 177 so that movement of the bar is transmitted to the pinion 177 and from the pinion to the idler gear 158 and from the gear to the pinion 165 thereby simultaneously swinging both arms 170 and 178 with knurls or rolls 174 and 182. A coil spring 190 between the end of the bar and a pin 192 in the extension of the plate urges the bar outwardly and the knurls away from the workpiece when not in use. The rack bar 186 is moved by an actuating rod 194 automatically moved by a fixed guide 196 mounted on a cam-actuated front cross slide (not shown).

In this form of tool assembly 150, the arms or tool holders moving from opposite directions produce a dead center pressure on the workpiece diameter.

What is claimed is:

1. A tool for use with a lathe turret having a circular body and a center opening and with a lateral passage running from its periphery to the center opening comprising, a plate body having diagonally opposed holes and a shank radiating from one side of the plate body and adapted to be extended into said lateral passage for attachment of said body to said turret, stud shafts respectively mounted in the respective opposed holes and extending from the opposite side of the plate body from the shank, pinions respectively carried upon said stud shafts, swing arms respectively fixed to the respective pinions and extending therefrom to oppose one another, rotatable knurl rolls respectively carried upon the free ends of the swing arms, a gear rotatably mounted upon the plate body between said pinions and intermeshing therewith and means carried upon the plate body operatively engaged with one of said pinions to pivot the pinions for swinging the arms and knurl rolls into engagement with opposite side of a workpiece when extended therebetween.

2. The tool as defined in claim 1 and said means for pivoting said pinions and swinging said arms including a spring pressed rack bar slidably carried by said plate body, meshing with the one pinion, and adapted to be actuated by a movable part of the lathe.

References Cited

UNITED STATES PATENTS

| | | | |
|---|---|---|---|
| 940,301 | 11/1909 | Carlborg | 29—57 XR |
| 1,435,453 | 11/1922 | Davis et al. | 29—57 XR |
| 2,436,950 | 3/1948 | Boyar | 72—703 |
| 3,455,189 | 7/1969 | Sweet | 82—1 |

FRANCIS S. HUSAR, Primary Examiner

U.S. Cl. X.R.

10—129; 29—57; 72—703; 77—21; 82—35; 90—11